United States Patent Office 3,036,889
Patented May 29, 1962

3,036,889
PROCESS OF PRODUCING BLACK OXIDE OF IRON
Friedrich Frey, Gumpendorferstr. 81, Vienna VI, Austria
No Drawing. Filed Apr. 1, 1958, Ser. No. 725,490
Claims priority, application Austria Apr. 11, 1957
10 Claims. (Cl. 23—200)

This invention relates to the production of black oxide of iron and concerns particularly the recovery of such black oxides of iron of finest particle size suitable for pigments.

The commercial production of black oxide of iron is almost exclusively based on wet processes, which provide pigments having a greater or smaller degree of fineness and a graded yield value and covering power in dependence on the starting material and on the particular production method used. Whereas the black oxide of iron obtained by a dry process comprising, e.g., the reduction of natural ferric oxides—artificial iron materials must be excluded for price reasons—followed by intensive grinding, is less expensive than that obtained in a wet process, the products are not satisfactory in quality, as a rule. Such dry processes for producing black oxide of iron are based on a partial reduction of the iron oxide-containing materials with carbonaceous substances or reducing carbonaceous gases. The starting materials are used in a particle size which is greatly in excess of the particle size of the end product so that the reduction must be followed in any case by a pulverization, which adversely affects the economy of the process to a decisive degree. Moreover, this reaction requires relatively long reaction times for obtaining in view of the particle size employed a reasonably uniform reduction throughout each particle. As a result of these difficulties, black oxides of iron obtained by dry reduction have not gained importance in practice so far particularly because the hue is often black having a brown tinge and the yield value is only one third of that of pigments produced by wet processes.

The increasing use of pigments of black oxide of iron in various fields, particularly by the building trade has given rise to an urgent need for a product which has a particularly high yield value, the finest particle size possible, which can be produced in a simple manner and which is inexpensive.

The invention is based on the idea to start from a material which eliminates the need for the time-consuming and expensive pulverizing operations after the reduction. This aim can be attained according to the invention in a surprisingly simple manner in that a material having a particle size which corresponds at least approximately to the particle size of the desired end product is used as a starting material consisting substantially of oxides of iron of higher degrees of oxidation, particularly of trivalent iron. Thus, according to the invention, such an iron oxide-containing material having a particularly small particle size is used, which has substantially the fineness usual for the end product, particularly the fineness usually achieved in pigments of black oxide of iron produced by wet processes.

According to the invention the temperatures to be maintained during this partial reduction may be as high as 1000° C. but a range of about 500°–800° C. is preferred in general. The reducing treatment is suitably effected with exclusion of air.

The product obtained by the process according to the invention has surprisingly substantially the same fineness as the starting material whereas an increase in particle size would have to be expected in view of the thorough chemical transformation and the application of temperatures as high as about 1000° C. Owing to its fineness the product obtained by the partial reduction can be used as a pigment immediately without thorough grinding processes or, if a slight agglomeration occurs, after a simple disintegration thereof in a pin mill. It distinguishes by a high yield value, which is of the same order as that of pigments obtained by wet processes as contrasted to the afore-mentioned black oxide of iron obtainable by dry processes. It has been found that the particle size is of decisive importance for the yield value. A further reduction of the particle size of pigments of black oxide of iron leads to an optimum, which is reached approximately with the products produced according to the invention having in most cases a particle size below 1 micron. Much smaller particles would have a colloidal fineness, with reduced yield value.

Particularly desirable results are obtained with the process according to the invention if the material to be reduced has a particle size substantially below 5 microns, preferably below 1 micron.

It has been found that a material for reduction which is particularly suitable for these purposes consists of the dust material which is obtained in large quantities by the refining of iron with pure oxygen, oxygen-bearing gases or gas mixtures, e.g., in the converter steelmaking process (oxygen blowing process). The dust is removed from such exhaust gases either in dry form or by a wet cleaning process, in most cases after a utilization of the heat in a waste heat plant. In a wet cleaning process, e.g., in a swirl tube washer, the dust is separated as sludge. The friable mass obtained by drying this sludge can easily be disintegrated to the original fineness and has proved excellently suitable just as the dry dust obtained from steel converters.

To attain the object of a partial reduction of the starting material having a high content of $Fe_2O_3$ to a product which consists substantially of $Fe_3O_4$ it is desirable to apply the respective reducing agent at least in the quantity which is stoichiometrically required to convert $Fe_2O_3$ into $Fe_3O_4$. A smaller of greater surplus of the reducing agent is recommendable if only to maintain a reducing atmosphere and is not detrimental if the other conditions of reduction are maintained.

It has been found that the partial reduction can be effected by a very short action on the material to be reduced. In general a time of action of a few minutes, e.g., up to 5 minutes, is sufficient. A sufficient reduction is even achieved within a time of only 30 seconds and less.

Within the scope of the invention the reducing agent may consist of carbonaceous solids usual per se, such as finely ground coal, e.g., brown coal, anthracite coal, charcoal, ground coke, soot and the like, and is preferably used in an intimate mixture with the iron oxides to be reduced.

Where converter dust is used an admixture of coal dust in an amount of 1–6%, preferably of 2–4%, by weight of the converter dust, has proved highly satisfactory for providing the black oxide of iron in the desired degree of fineness when heated to 500–700° C. Where dried sludge is used as a starting material, the same is slightly preground and is then intimately mixed with coal dust or a similar reducing agent. It has been found that a preliminary comminution of the dried sludge to a particle size up to 0.5 mm. is sufficient to ensure a reduction throughout the particle.

According to the invention the partial reduction may also be effected with liquid or semisolid carbonaceous materials, including hydrocarbons. To this end, e.g., fuel oil, spindle oil or the like mineral oil products, fatty oils and their waste products, waste sulphite liquor, molasses and the like are soaked or intimately mixed with the material to be reduced and are subjected in this form to the partial reduction.

The transformation of the oxides of iron into black oxide of iron may be effected to special advantage with reducing gases such as hydrogen, carbon monoxide, or gas mixtures which contain hydrogen and/or carbon monoxide. In this case the reducing gases may entrain the material to be reduced. For this reason it is within the scope of the invention to subject the hot exhaust gases, e.g., of the oxygen converter process, directly to the partial reduction described and directly to precipitate black oxide of iron from the smoke.

As soon as the reduction has caused the desired transformation of the coloured oxides of iron into black oxide of iron it is recommendable to prevent any reversal of the reduction by cooling the reduced material. To this end it is desirable to cool below the reoxidizing temperature. This may suitably be effected with exclusion of air or in an inert atmosphere. Suitable inert gases are, inter alia, carbon dioxide and nitrogen. This cooling is preferably effected to a temperature below 300° C., if desired down to 70° C., which is entirely sufficient to prevent reoxidation. In another desirable embodiment the cooling may be effected by quenching in a liquid such as water or an aqueous solution.

Where a particularly high purity of the product produced according to the invention is required, it may be suitable to remove the accompanying elements contained in the dust from the converter or similar starting materials. The usual content of alkaline earths, mainly calcium oxide, in converter dust is about 3.5%. For this reason a pre- or after-treatment with acids, e.g. with dilute hydrochloric acid, may be effected to remove calcium oxide and similar admixtures in order to avoid undesirable effects in the use of the pigment.

The invention will be explained more fully in the following examples relating to several embodiments whereas the invention is not restricted thereto.

*Example 1*

The starting material consists of converter dust, which was separated by a wet process and subsequently dried. It had the following composition:

| | Percent |
|---|---|
| $SiO_2$ | 1.38 |
| $Al_2O_3$ | 0.05 |
| $Fe_2O_3$ | 87.30 |
| $FeO$ | ---- |
| $Mn_3O_4$ | 3.91 |
| $CaO$ | 3.50 |
| $MgO$ | 0.93 |

Balance: Traces of S and P and moisture, ignition loss.

This material, which had formed soft agglomerates by the drying of the sludge obtained by the wet separation, is intimately mixed with 5% coal dust (related to the weight of the converter dust) having a fineness of about 4900 mesh per square centimetre and is then ground in a pin mill to a fineness of 0–0.5 mm. The production apparatus consists of a rotary kiln, which is sealed from the surrounding atmosphere. The material to be reduced is fed by means of a screw conveyor to the heating zone of the rotary kiln, in which it is conveyed further as a result of the inclination and rotation of the kiln and is heated to about 650° C. When this temperature is reached at the end of the heating zone the reduction is terminated. The selected conditions are such that the material is subjected in the kiln for less than 5 minutes to the reducing action occurring at a temperature above 400° C. The material passes after the heating zone through a cooling zone of the rotary kiln, which zone is cooled from the outside with flowing water. The material is cooled here to about 100° C. and is then discharged from the kiln again with a screw conveyor. This is effected about 10 minutes after the material has entered the kiln. Any agglomerates formed during the reduction process are broken up in a subsequently arranged pin mill.

To determine the yield value the black oxide of iron which has been obtained is mixed with lithopone and linseed oil varnish, using 1 part by weight of oxide black per 20 parts by weight of lithopone. For comparison, a wet-precipitated black oxide of iron produced by Farbenfabriken Bayer, Leverkusen, is also mixed with lithopone and used as a standard specimen. In order to obtain the same brightness 0.9 part by weight of the wet-precipitated pigment of black oxide of iron must be admixed per 20 parts by weight of lithopone as in the specimen prepared with the black oxide of iron according to example 1. In accordance therewith the yield value of the pigment obtained according to Example 1 is defined as 90%.

*Example 2*

The converter dust used here comes from a dry-process dust collecting plant and consists of a major portion having a particle size below 0.4 micron, only small amounts having a particle size down to 1 micron. This dust has the following composition:

| | Percent |
|---|---|
| $SiO_2$ | 1.27 |
| $Al_2O_3$ | 0.28 |
| $Fe_2O_3$ | 89.99 |
| $FeO$ | 1.08 |
| $Mn_3O_4$ | 4.48 |
| $CaO$ | 0.18 |

Balance: Traces of MgO, P and S as well as moisture and ignition loss.

The fine powder of the converter dust is intimately mixed in a mixing drum or edge runner with 5% spindle oil (related to the weight of the dust) and is then conveyed with a screw conveyor from a bin into the heating zone of the rotary kiln. The further treatment in the rotary kiln is the same as in Example 1.

The pigment thus recovered showed a higher yield value than the standard specimen when compared therewith. To obtain the same brightness, 1.1 parts by weight of the wet-precipitated pigment are required per 20 parts by weight of lithopone compared to 1 part by weight of the pigment obtained according to Example 2 also in a mixture with 20 parts by weight lithopone. This corresponds to a yield value of 110%.

*Example 3*

The starting material is the same as in Example 2. Without pretreatment it is fed by a metering screw conveyor into a rotary kiln of the type described in Example 1. The reducing atmosphere required for the chemical reaction is produced by forcing carbon monoxide gas by means of a piston pump into the heating zone of the rotary kiln. The above-mentioned metering screw conveyor and the carbon monoxide gas pump are controlled so that about 120 grams or a somewhat greater amount of carbon monoxide gas are pumped into the kiln per 1000 grams of converter dust introduced. This appears to ensure a sufficient surplus of gas. The chemical reaction in the heating zone and the further processing are then effected in accordance with the description given in Example 1.

The black oxide of iron obtained by the new process can be used wherever wet-precipitated pigment has been used before. In view of its high yield value it can be used particularly where a relatively small addition is desired to give a strong colouring effect, e.g., as a colouring admixture to cement, concrete, Eternit, artificial stone and similar building materials.

I claim:

1. A process of producing black iron oxide pigment, comprising the steps of subjecting substantially dry ferric oxide-containing converter dust having a particle size corresponding to the particle size of said black iron oxide pigment and being above colloidal dimensions but not exceeding 5 microns, in the presence of a reducing agent adapted to reduce ferric oxide at elevated temperatures to ferroso-ferric oxide, to said elevated temperature for a period of time sufficient to substantially reduce said ferric oxide of said converter dust to ferroso-ferric oxide; and cooling the thus obtained material below the temperature at which said ferroso-ferric oxide is re-oxidized to ferric oxide, whereby a stable black iron oxide pigment is obtained.

2. A process of producing black iron oxide pigment, comprising the steps of subjecting substantially dry converter dust of the type obtained by refining iron with an oxidizing gaseous medium and having a particle size corresponding to the particle size of said black iron oxide pigment and being above colloidal dimensions but not exceeding 5 microns, in intimate contact with a reducing agent adapted to reduce ferric oxide at elevated temperatures to ferroso-ferric oxide, for a period of up to five minutes to a temperature of between 400° and 1000° C. so as to substantially reduce said ferric oxide of said converter dust to ferroso-ferric oxide; and cooling the thus obtained material below the temperature at which said ferroso-ferric oxide is re-oxidized to ferric oxide, whereby a stable black iron oxide pigment is obtained.

3. A process of producing black iron oxide pigment, comprising the steps of subjecting a substantially dry ferric oxide-containing converter dust having a particle size below 5 microns and above colloidal dimensions corresponding to the particle size of said black iron oxide pigment, in the presence of coal dust in a quantity of between 1 and 6% of the weight of said material and adapted to reduce ferric oxide at elevated temperatures to ferroso-ferric oxide, to a temperature of between 500° C. and 700° C. for a period of time sufficient to substantially reduce said ferric oxide of said converter dust to ferroso-ferric oxide; and cooling the thus obtained material below the temperature at which said ferroso-ferric oxide is re-oxidized to ferric oxide, whereby a stable black iron oxide pigment is obtained.

4. A process of producing black iron oxide pigment, comprising the steps of subjecting a substantially dry ferric oxide-containing converter dust having a particle size below 5 microns and above colloidal dimensions corresponding to the particle size of said black iron oxide pigment, in the presence of coal dust in a quantity of between 2 and 4% of the weight of said material and adapted to reduce ferric oxide at elevated temperatures to ferroso-ferric oxide, to a temperature of between 500° and 700° C. for a period of time sufficient to substantially reduce said ferric oxide of said converter dust to ferroso-ferric oxide; and cooling the thus obtained material below the temperature at which said ferroso-ferric oxide is re-oxidized to ferric oxide, whereby a stable black iron oxide pigment is obtained.

5. A process of producing black iron oxide pigment, comprising the steps of subjecting a substantially dry ferric oxide-containing converter dust having a particle size below 5 microns and above colloidal dimensions corresponding to the particle size of said black iron oxide pigment, in the presence of a reducing agent adapted to reduce ferric oxide at elevated temperatures to ferroso-ferric oxide, to said elevated temperature for a period of time sufficient to substantially reduce said ferric oxide of said converter dust to ferroso-ferric oxide; and cooling the thus obtained material to a temperature of between 300° and 70° C., whereby a stable black iron oxide pigment is obtained.

6. A process of producing black iron oxide pigment, comprising the steps of subjecting a substantially dry ferric oxide-containing converter dust having a particle size below 5 microns and above colloidal dimensions corresponding to the particle size of said black iron oxide pigment, in the presence of a reducing agent adapted to reduce ferric oxide at elevated temperatures to ferroso-ferric oxide to said elevated temperature for a period of time sufficient to substantially reduce said ferric oxide of said converter dust to ferroso-ferric oxide; and quenching the thus obtained material to below the temperature at which said ferroso-ferric oxide is re-oxidized to ferric oxide, whereby a stable black iron oxide pigment is obtained.

7. A process of producing pigments of black oxide of iron, comprising the steps of subjecting an iron oxide-containing converter dust of the type obtained in converter steelmaking by the oxygen blowing process to a partial reduction by heating it in intimate contact with a reducing agent, said converter dust having substantially the particle size of commercial pigments of black oxide of iron produced by wet processes and being above colloidal dimensions but not exceeding 5 microns, and subsequently cooling the treated material below the reoxidation temperature thereof.

8. A process as set forth in claim 1, in which said starting material has mainly a particle size below 1 micron.

9. A process as set forth in claim 1, in which said reducing agent is selected from the class consisting of finely ground coal, finely ground coke, and soot.

10. A process as set forth in claim 1, in which said reducing agent is a gas which contains at least one of the gases selected from the class consisting of hydrogen and carbon monoxide.

References Cited in the file of this patent

UNITED STATES PATENTS

| 210,619 | Mason | Feb. 11, 1878 |
| 672,192 | MacDonald | Apr. 16, 1901 |
| 2,596,954 | Heath | May 13, 1952 |
| 2,692,050 | Nelson | Oct. 19, 1954 |
| 2,694,656 | Camras | Nov. 16, 1954 |
| 2,870,003 | Cavanagh | Jan. 20, 1959 |
| 2,900,236 | Speed et al. | Aug. 18, 1959 |

FOREIGN PATENTS

| 4,201 | Great Britain | 1881 |
| 722,175 | Great Britain | Jan. 19, 1955 |

OTHER REFERENCES

Shelton et al.: "The Iron Age," 149, 54–9 (June 11, 1942).